United States Patent [19]

Blomquist

[11] 4,133,224

[45] Jan. 9, 1979

[54] SEMI-AUTOMATIC TRANSMISSIONS

[75] Inventor: Alfred P. Blomquist, Farmington Hills, Mich.

[73] Assignee: Chrysler Corporation, Highland Park, Mich.

[21] Appl. No.: 820,172

[22] Filed: Jul. 29, 1977

[51] Int. Cl.² ............................................. F16H 3/44
[52] U.S. Cl. .................................... 74/750 R; 74/792;
74/781 R; 192/3.52; 912/21; 74/761
[58] Field of Search ................. 74/750 A, 781 R, 784,
74/789, 792, 760; 192/21, 51, 3.52, 3.54

[56] References Cited

U.S. PATENT DOCUMENTS 2,863,334  12/1958  Babcock ................................. 192/51

FOREIGN PATENT DOCUMENTS 649436  6/1935  Fed. Rep. of Germany ............. 74/792
781944  8/1957  United Kingdom ................... 192/3.52

Primary Examiner—Benjamin W. Wyche
Assistant Examiner—Jery Anderson
Attorney, Agent, or Firm—Baldwin & Newtson

[57] ABSTRACT

A semi-automatic transmission incorporating self-energizing cone clutches which make use of radially distributed overlapping helical surfaces for establishing a drive connection in the clutch and for aiding in its energization.

6 Claims, 4 Drawing Figures

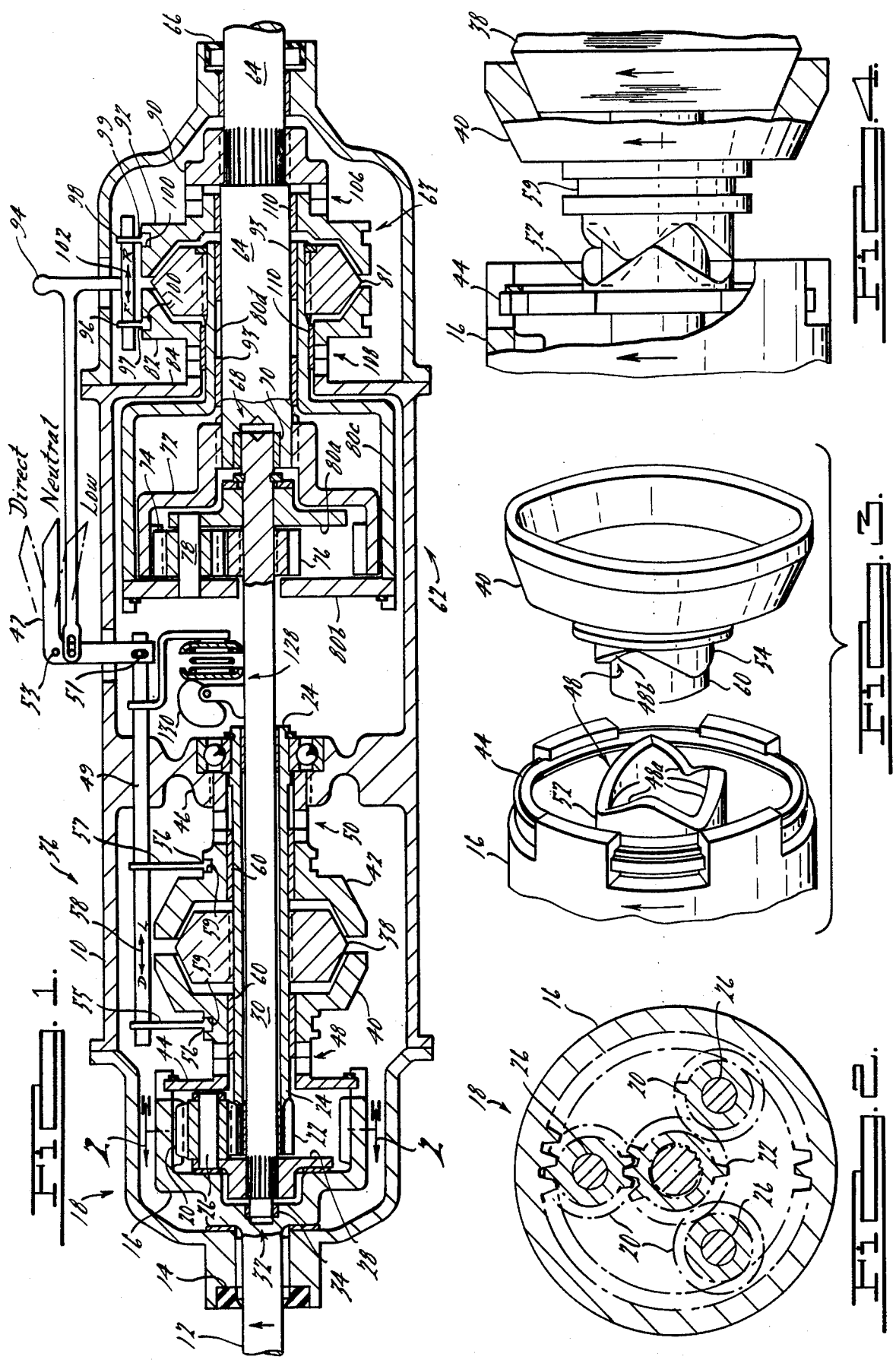

SEMI-AUTOMATIC TRANSMISSIONS

BACKGROUND OF THE INVENTION

This invention relates to transmissions which incorporate clutches of the type disclosed and claimed in U.S. Pat. No. 3,977,503; U.S. Pat. No. 4,022,308 and pending applications, now U.S. Pat. No. 4,051,934, Ser. No. 679,529; Ser. No. 706,365, now U.S. Pat. No. 4,049,102, among others. The content of these patents and patent applications is incorporated herein by reference.

SUMMARY OF THE INVENTION

The transmissions of this invention are preferably semi-automatic and are particularly suitable for small automobiles, snowmobiles, motorcycles, lawnmowers and the like. They are two-speed semi-automatic transmissions and include a reversing gear.

The transmissions include clutch members which are drivingly interconnected by sets of overlapping radially distributed helical surfaces carried on adjacent clutch members. The transmissions also include planetary gear sets for transferring rotation from the transmission input to its output and which provide multiple gear ratios and reversing. The clutches and gear sets cooperate for selectively transmitting torque from transmission input to output means.

THE DRAWING FIGURES

FIG. 1 is a side elevational view in section of a preferred transmission arrangement according to the invention.

FIG. 2 is a section view taken along lines 2—2 of FIG. 1.

FIG. 3 is an exploded detail view in perspective of part of FIG. 1 showing the overlapping helical surfaces in one part of one of the transmission clutches.

FIG. 4 is a fragmentary view of part of FIG. 1 showing the helical surfaces and cones of one part of one of the transmission clutches in driving engagement.

PREFERRED EMBODIMENT

FIG. 1 shows a transmission having a stationary housing 10. At its forward end, the transmission includes an input shaft 12 supported on a suitable bearing member 14 seated in housing 10. A ring gear or annulus 16, constituting one element of a planetary gear set 18, is fixed to the end of the input shaft 12. Gear set 18 is a simple planetary type. Planetary gear set 18 has a plurality (only one shown in FIG. 1) of spaced pinion gears 20 meshing with a sun gear 22 and ring gear 16. The sun gear 22 is fixed to the forward end of a sleeve-like shaft 24. Pinion gears 20 are rotatably mounted upon shafts 26 supported in an annular carrier 28. Annular carrier 28 is fixed to the forward end of a first output shaft 30 which extends coaxially through sleeve shaft 24 and is rotatably carried therein. The forward end of shaft 30 preferably fits into the end of input shaft 12 as shown at 32 for support and rotation therein. A suitable bearing 34 may be included to provide for adequate journaling between the shafts. FIG. 2 shows further detail of most parts of planetary gear set 18 in sectional plan view.

A cone clutch 36 comprising first and second clutch means and including a plurality of rotary clutch members is positioned on shafts 24 and 30 adjacent gear set 18. An axially fixed rotary clutch means, member or male cone 38, constituting one member of clutch 36, is fixed on sleeve shaft 24 for rotation therewith. Reaction members or rotary female cone clutch members 40 and 42, constituting other members of clutch 36, are positioned respectively to each side of male cone 38. The female cones are slidable and rotatable on sleeve shaft 24, although their rotation about shaft 24 is controlled by respectively adjacent second clutch reaction members or end members 44 and 46 which are axially fixed. The female cones may be moved axially back and forth along sleeve shaft 24 over a limited axial extent of travel so that one or the other may selectively engage male cone 38 or both may by positioned a distance away therefrom as shown in FIG. 1 (the neutral position). Selective engagement between a female cone and the male cone is provided by levers 47 and 49 which are pivotally joined together at 51. Lever 47 is also pivotally supported at 53. Two yoke members 55 and 57 are fixed to lever arm 49. The lower portions 56 are received in annular grooves 59 on female cones 40 and 42 respectively so that each yoke member may maintain contact with its respective female cone as the cone rotates. As is shown in more detail in the above referenced, related patents and patent applications. Yokes 55 and 57, being fixedly secured to lever arm 49 and fitted to the female cones, maintain the female cones in a fixed spatial relationship relative to each other on sleeve shaft 24. When lever 47 is rotated upwardly or downwardly about pivot point 53, lever arm 49 is caused to move in one direction or the other as indicated by arrow 58. Consequently, one or the other of female cones 40 and 42 may be selectively brought into engagement with male cone 38 or both may be simultaneously positioned to each side of male cone 38, as shown in FIG. 1, by the axial movement imparted to the cones through the movement of the lever arms.

End member 44 of clutch 36 takes the form of an annular end part fitted into ring gear 16 and rotatable therewith on sleeve shaft 24. End member 44 and female cone 40 are joined together through a set of radially distributed helical surfaces 48 carried by both members and extending therebetween in constantly overlapping relationship. The extent of the overlap varies depending on the axial position of female cone 40 relative to the end member.

End member 46 is stationary and preferably takes the form of a portion of housing 10 and is similarly joined to female cones 42 through a set of constantly overlapping radially distributed helical surfaces 50 carried by both members and extending therebetween in overlapping relationship. Again, the extent of the overlap varies depending on the axial position of female cone 42 relative to the end member.

The overlapping helical surfaces 48 which join end member 44 and female cone 40 are best seen in FIG. 3. The helical surfaces are shown as end portions of extensions 52 and 54 which project from the adjoining members 44 and 40 respectively toward each other to establish the continual overlapping adjoining relationship therebetween by means of the helical surface portions. To facilitate and stabilize the axial sliding movement of female cones 40 and 42 on sleeve shaft 24, each cone is fitted with an extending bushing 60. The distance over which the cone may travel is purposely limited and is selected such that the helical surfaces 48 always overlap somewhat so that a driving connection may be made therebetween when the female cone is moved to engage the male cone, this condition being shown in FIG. 4. On the other hand, the helical surfaces can be nested together when the female cone is moved away from the male cone. FIG. 4 shows the helical surfaces of female cone 40 and is illustrative of all the various helical surfaces and associated clutch members described herein in connection with other parts of the transmission as well.

In FIG. 3, for the specific parts shown, i.e., end member 44 and female cone 40, and upon rotation in the direction indicated by the arrow, i.e., clockwise rotation as viewed from the rearward end of the transmission (arbitrarily selected), helical surfaces 48a of end member 44 will drivingly contact helical surfaces 48b of female cone 40, as shown in FIGS. 3 and 4, upon axial movement of female cone 40 into engagement with male cone 38. Upon axial movement of female cone 40 away from male cone 38, the helical surfaces nest together and end member 44 and female cone 40 continue the joint rotation so long as end member 44 is caused to rotate, as by input shaft 12 for example. However, in the nested condition, female cone 40 merely idles on sleeve shaft 24.

As shown in FIGS. 3 and 4, it is preferred that at least three active or engageable helical surfaces 48a and 48b be provided on each adjacent member respectively. However, two per member or more than three are acceptable.

In clutch 36, it is preferred that the helical surfaces have the same helix on both sides so that both clutches can carry drive and coast torque. However, the helical surfaces 50 between female cone 42 and end member 46 may also be "opposite handed" relative to helical surfaces 48. That is, they may spiral in the opposite direction. Thus, helical surfaces 50 would look like helical surfaces 48 as is illustrated in FIG. 3, but would have an opposite helical spiral to them. The sets would in effect be mirror images of each other.

Since end member 46 is a stationary part of housing 10, the axial movement of female cone 42 into engagement with male cone 38 and the resultant mutual engagement of helical surfaces 50 will "ground" male cone 38 to housing 10 and prevent rotation of male cone 38, sleeve shaft 24 and sun gear 22.

Providing a unidirectional rotary input at shaft 12 in the clockwise direction as previously defined provides "direct" drive "D" of shaft 30 when female cone 40 is engaged with male cone 38 (providing a first clutch means, including reaction member 44) to lock sun gear 22 to ring gear 16 for joint rotation therewith. "Low" speed drive "L" is provided when female cone 42 is engaged with male cone 38 (providing a second clutch means, including reaction member 46) to "ground" sun gear 22 to housing 10, preventing its rotation and causing the rotation of shaft 30 to be provided by the rotation of pinion gears 20 as they are rotated by ring gear 16 and caused to "walk" around sun gear 22 rotating carrier 28 at a reduced gear ratio. Shaft 30 functions as an output means for this section of the transmission.

The capability for reversing the directional rotation of shaft 30 at the output of the transmission is provided by the planetary gear set 62, clutch 63, and second output shaft 64. Second output shaft 64 is located at the rearward end of the transmission, abutting first output shaft 30 and axially aligned with it. Shaft 64 is supported on a suitable bearing member 66 seated in housing 10. As shown at 68, the rearward end of first output shaft 30 fits into the forward end of second output shaft 64 for support and rotation therein. A suitable bearing 70 may be included to provide adequate journaling between the shafts.

A ring gear or annulus 72, constituting one element of a multi-element planetary set in the combined structure 62, is fixed to the output shaft 64. As with set 18, the planetary set is of the simple type having a plurality (only one shown) of spaced pinion gears 74 meshing with a sun gear 76 and ring gear 72. The sun gear 76 is fixed to shaft 30. Pinion gears 74 are rotatably mounted upon shafts 78 which are supported in an annular carrier 80, having several parts. Annular or planet carrier 80 is rotatable about shaft 30 but is carried thereon in an axially, substantially fixed position. A cone clutch 63 comprising third and fourth clutch means and including a plurality of clutch members is positioned about shaft 64 adjacent gear set 62. An axially fixed rotary clutch means, member or male cone 81, constituting one member of clutch 63, is positioned on shaft 64 for rotation thereon and is fixed to planet carrier extension portion 80c, which forms a sleeve-like shaft extension over shaft 63 at 80d. Reaction members or rotary female cone clutch members 82 and 92, constituting other members of clutch 63, are positioned for rotation respectively to each side of male cone 81. The female cones are rotatable about shaft 64 and in the case of female cone 82, about sleeve portion 80d of planet carrier 80. The female cones are also slidable on shaft 63 and sleeve portion 80d. Their rotation about sleeve portion 80d and shaft 64 is controlled by respectively adjacent clutch reaction members or end members 84 and 90 which are axially fixed. The female cones may be moved axially back and forth over a limited axial extent of travel so that one or the other may selectively engage male cone 81 or both may be positioned a distance away therefrom as shown in FIG. 1 (the neutral position). Bearings 93 may be added to the structure as shown to facilitate relative movement of various parts.

Selective engagement between a female cone and the male cone is controlled by lever 94. Two yoke members 96 and 98 are fixed to lever 94. The lower portions, 97 and 99 respectively, of the yokes are received in annular grooves 100 on each of female cones 82 and 92 so that each yoke member maintains contact with its respective female cone as the cone rotates in the same manner as is described in the above referenced, related patents and patent applications. Since the yoke arms are fixed to cover 94, they maintain the female cones in a fixed spatial relationship relative to each other on shaft 64. When lever 94 is shifted in either direction, as indicated by arrow 102, one or the other of the female cones is selectively brought into engagement with male cone 81 or both may be simultaneously positioned to each side of male cone 81, as shown in FIG. 1, by the movement of the lever.

Adjacent to female cone 92 and rearward thereof is a clutch reaction member or end member 90, which is axially fixed on shaft 64 for rotation therewith. Adjacent female cone 82 and forward thereof is the other clutch reaction member or end member 84 which is axially fixed and is part of stationary housing 10. Reaction member 90 is joined to female cone member 92 through a set of radially distributed helical surfaces 106 carried by both members and extending therebetween in continual overlapping relationship. Helical surfaces 106 are the same as helical surfaces 50 described herein above. As before, the extent of the overlap varies depending on the axial position of female cone 92, but there is always some overlap.

Reaction member 84 is joined to female cone member 82 through a set of radially distributed helical surfaces 108 carried by both members and extending therebetween in continual overlapping relationship. Helical surfaces 105 are the same as helical surfaces 48 described hereinabove. As before, the extent of the overlap varies depending on the axial position of female cone 82, but there is always some overlap.

To facilitate and stabilize the axial movement of the female cones, they are fitted with an extending bushing 110, like bushings 60 on female cones 40 and 42.

Engagement between one set of male-female cones or the other in clutch 63 adds the reversing feature to the transmission. Unidirectional rotation of shaft 30, whether of a reduced gear ratio or not may be selectively transmitted to output shaft 64 or reversed in direction and transmitted to the output shaft. Assuming rotation of shaft 30 as indicated by the arrow at the forward end of the transmission, i.e., rotation in a clockwise direction as previously defined, engagement of female cone 92 with male cone 81 (constituting a fourth clutch means, including reaction member 90) by suitably positioning lever arm 94 at the "F" position (forward) causes helical surfaces 106 to drivingly engage, in much the same way as illustrated in FIG. 4, thereby rotating output shaft 64 in the same direction as shaft 30 is rotating. On the other hand, engagement of female cone 82 with male cone 81 (constituting a third clutch means, including reaction member 84), "grounds" carrier 80 to stationary housing 10 preventing carrier rotation. Pinion gears 74 therefore rotate in place by rotation of sun gear 76 and impart a reverse rotation to ring gear 72 and to output shaft 64 relative to the rotation provided by shaft 30.

Semi-automatic operation of the transmission is provided by the flyweight governor assembly 128 which is responsive to throttle position by virtue of its reaction to rotation of shaft 30 upon which governor weight 130 is carried, in the manner that is well known in the art. Consequently, semi-automatic shifting is accomplished as follows:

LOW: Throttle of engine to which input shaft 12 is attached in operation (not shown) is opened to initiate rotation of input shaft 12. Lever 94 is placed in the "F" position to engage cones 81 and 92. Lever 47 is placed in the "L" position to engage cones 38 and 42.

DIRECT: Closing the throttle reduces the cone clutch torque and allows flyweight governor 130 to upshift lever 47 by reaction of flyweight 130 against spring assembly 132 in the well known manner. This action engages cones 38 and 40.

DOWNSHIFT: Closing the throttle reduces input torque of shaft 12 and lever 47 is manually operated.

REVERSE: Lever 94 is manually operated as previously described.

It should be noted that an actual installation would preferably include a torque converter or clutch ahead of the transmission to provide for idle in gear.

What is claimed is:

1. A transmission having power input means; a first output shaft adjacent the input means and extending away therefrom; a second output shaft axially aligned with the first output shaft and extending away therefrom; first and second planetary gear sets interconnecting the input means and the first output shafts and the first and second output shafts, respectively, for transmitting torque therebetween, the gear sets each comprising rotatable members including sun and ring gears and a planet carrier with planet gears; first and second selectively engageable clutch means and third and fourth substantially engageable clutch means for cooperating at selected times with members of the first and second planetary gear sets, respectively, to control the rotation thereof;

the first clutch means selectively forming a connection between a first member of the planetary gear set, which is connected to the input means, and a second member of the planetary gear set; the first clutch means comprising axially fixed rotary clutch means connected to the second member of the planetary gear set for rotation therewith, a clutch reaction member and an axially movable rotary clutch member positioned between the clutch reaction member and the fixed rotary clutch means; the clutch reaction member being axially aligned with the movable rotary clutch member and connected to the first planetary gear member for rotation therewith; the axially movable rotary clutch member being adapted for selectively establishing the connection between the first and second members of the planetary gear set by selective engagement with the axially fixed rotary clutch means and by continual engagement between the movable clutch member and the clutch reaction member at adjacent end portions thereof as provided by a plurality of complementary, radially distributed, overlapping helical camming surfaces on the adjacent engaging end portions, the surfaces extending therebetween in mutual overlapping relationship over the complete range of axial movement of the axially movable clutch member to couple the two members together whereby rotation of one member relative to the other causes driving engagement between the corresponding complementary camming surfaces;

the second clutch means selectively forming a connection between ground and the second member of the planetary gear set whereby rotation of the second member of the planetary gear set is prevented; the second set of clutch members comprising axially fixed rotary clutch means connected to the second member of the planetary gear set for rotation therewith, a clutch reaction member and an axially movable rotary clutch member positioned between the clutch reaction member and the fixed rotary clutch member, the clutch reaction member being axially aligned and grounded against rotation; the axially movable rotary clutch member being adapted for establishing connection between ground and the second member of the planetary gear set by selective engagement with the axially fixed rotary clutch means and by continual engagement between the movable clutch member and the clutch reaction member at adjacent end portions thereof as provided by a plurality of complementary radially distributed, overlapping helical camming surfaces carried on the adjacent engaging end portions of the two clutch members, the surfaces extending therebetween in mutual overlapping relationship over the complete range of axial movement of the axially movable rotary clutch member whereby partial rotation of the axially movable rotary clutch member causes locking engagement between the corresponding complementary camming surfaces and locks the second member of the planetary gear set against rotation; the second planetary gear set being carried by the first output shaft near the end thereof adjacent the second output shaft, the sun gear of the second planetary gear set being fixed to the first output shaft, the ring gear thereof being fixed to the second output shaft for rotation therewith, the third and fourth selectively engageable clutch means being carried by the second output shaft;

the third clutch means comprising axially fixed rotary clutch means connected to and rotatable with the planet carrier, a clutch reaction member axially aligned with the fixed rotary clutch member and attached to ground and locked against rotation and an axially movable rotary clutch member positioned between the axially fixed rotary clutch member being adapted for selectively establishing connection between the planet carrier and ground by selective engagement with the axially fixed rotary clutch means and by continual engagement between the clutch reaction member and the axially movable rotary clutch member at adjacent end portions thereof as provided by a plurality of complementary radially distributed, overlapping helical camming surfaces on the adjacent engaging end portions, the surfaces extending therebetween in mutual overlapping relationship over the complete range of axial movement of the axially movable rotary clutch member whereby partial rotation of one member and engagement of the axially movable clutch member with the axially fixed rotary clutch means causes locking engagement between the camming surfaces and thereby locks the planet carrier against rotation, and the fourth clutch means comprising axially fixed rotary clutch means connected to and rotatable with the planet carrier, clutch reaction member axially aligned with the fixed rotary clutch member and fixed to the second output shaft for rotation therewith and an axially movable rotary clutch member positioned between the axially fixed rotary clutch member and the clutch reaction member and rotatable about the second output shaft; the axially movable rotary clutch member being adapted for selectively establishing connection between the ring gear and the planet carrier by selective engagement with the axially fixed rotary clutch means and by continual engagement between the axially movable rotary clutch member and the clutch reaction member at adjacent end portions thereof as provided by a plurality of complementary radially distributed, overlapping helical camming surfaces on the adjacent engaging end portions, the surfaces extending therebetween in mutual overlapping relationship over the complete range of axial movement of the axially movable rotary clutch member thereby partial rotation of one member causes driving engagement between the camming surfaces of both members and the ring gear and planet carrier thereby rotate together upon rotation of the first output shaft.

2. The transmission of claim 1 wherein the second member of the first planetary gear set is the sun gear.

3. The transmission of claim 2 wherein the input means is connected to the planet ring gear of the first planet gear set.

4. The transmission of claim 1 wherein the rotary clutch members are of the conical type.

5. The transmission of claim 1 including means connecting the planet ring gear of the first planet gear set to the input means and the planet carrier of the first planet set to the first output means.

6. The transmission of claim 1 wherein the input and first output means comprise axially aligned input and output shafts and a sleeve shaft encompassing an intermediate portion of the output shaft; the planetary gear carrier of the first planet set is carried on the first output shaft; the input shaft is connected to the planet ring gear of the first planet set for rotation therewith; the first output shaft is connected to the planet carrier of the first planet set for rotation therewith; the sleeve shaft is connected to the sun gear of the first planet set for rotation therewith; the axially movable clutch member of the first clutch means is positioned for rotation on the sleeve shaft adjacent to the fixed clutch means, which is carried by the sleeve shaft for rotation therewith; the axially fixed reaction member of the first clutch means is attached to the planet ring gear of the first planet set and positioned for rotation on the sleeve shaft, and the axially movable clutch member of the second clutch means is rotatably carried on the sleeve shaft.

* * * * *